Patented Jan. 7, 1958

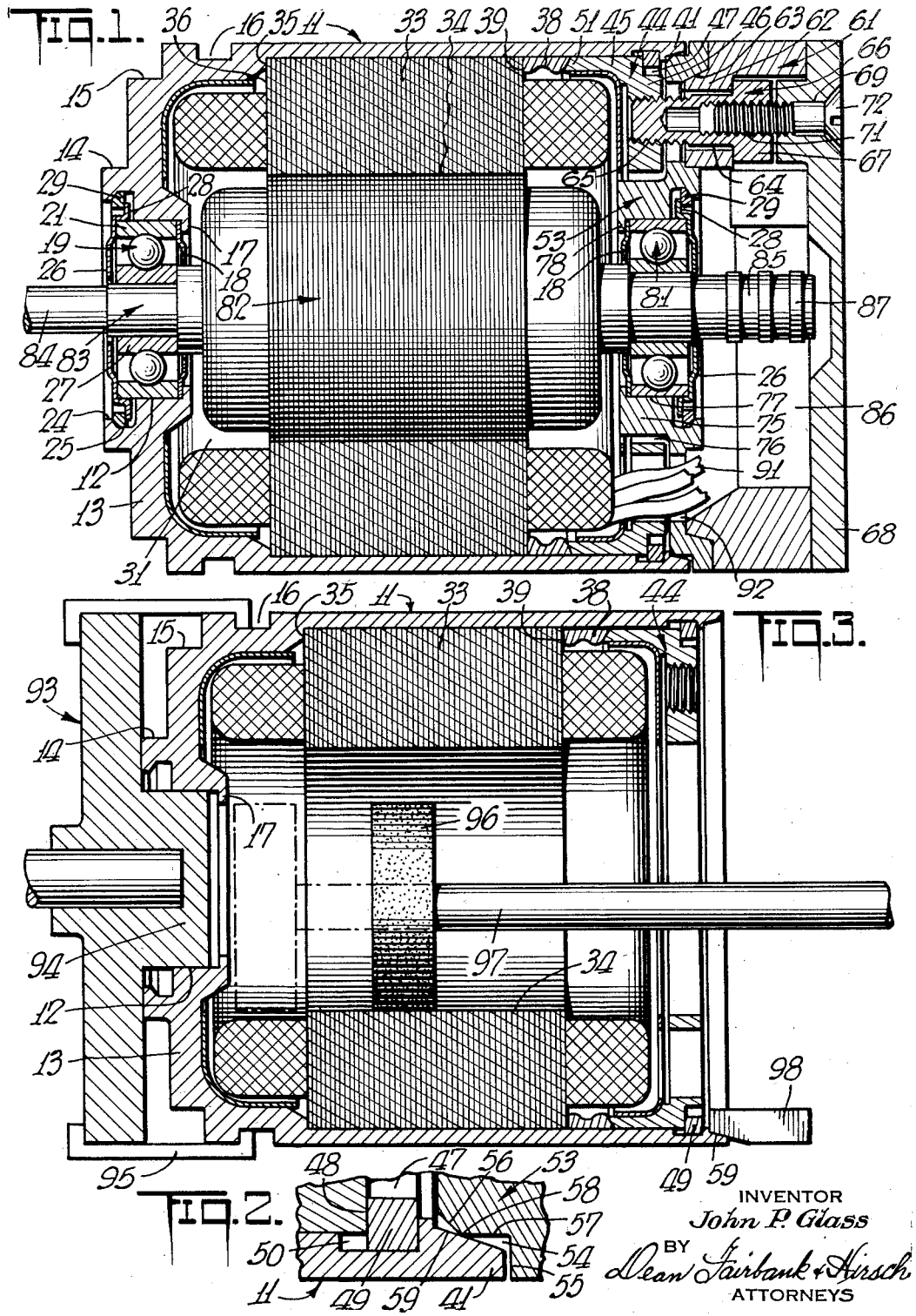

2,819,417

SYNCHRO CONSTRUCTION AND METHOD FOR MAKING SAME

John P. Glass, Clifton Heights, Pa.

Application November 18, 1954, Serial No. 469,786

5 Claims. (Cl. 310—258)

This invention relates to the art of electrical motors, more particularly of the type known as Synchros.

As conducive to an understanding of the invention, it is noted that in electrical units of the type known as "Synchros" which, for example, translate shaft position into electrical information or vice versa, for maximum accuracy of the unit it is essential that the manufacturing techniques employed introduce the minimum amount of mis-alignment between the elements of the unit and that the design of the unit be such as to facilitate such manufacturing techniques. More specifically, it is essential that the axis about which the rotor turns in the bore of the stator be aligned with the axis of said bore and that the stator bore be truly cylindrical.

Where to provide the extreme accuracy of alignment between the rotor axis and the axis of the stator bore and to make the stator bore truly cylindrical, the stator bore and the bearing bores in the casing of the unit are ground with a single tool in one operation and are of the same diameter, in addition to the fact that the same tool is not best suited for the different material as from which the stator and casing are made, as standard bearings are in fixed size ranges, the stator bore diameter might not be of the required size for the desired electrical characteristics.

Where the stator bore is made of the desired diameter and sleeves are inserted into the bearing bores to receive the standard bearings of the most appropriate size, the sleeves must be made by precision methods adding materially to the cost and without complete assurance that accurate alignment of the bearings and the stator bore will be achieved.

It is accordingly among the objects of the invention to provide a method of manufacturing Synchros which may readily be performed with conventional tools at relatively high speed and which will insure that the axis about which the rotor turns in the stator bore will be aligned with the axis of said stator bore and that the stator bore will be truly cylindrical and which permits selection of the optimum diameter of the stator bore for desired electrical characteristics without need for compromise due to the available range of bearing sizes.

Another object is to provide a Synchro unit of extreme accuracy which has but few simple parts which may readily be fabricated at relatively low cost by the method above described and which may readily be assembled to provide a precision unit of the desired electrical characteristics.

According to the invention, these objects are accomplished by the combination of elements hereinafter described and particularly recited in the claims.

In the accompanying drawings in which are shown one or more of various possible embodiments of the several features of the invention, Fig. 1 is a longitudinal sectional view of the Synchro, Fig. 2 is a detail sectional view on a greatly enlarged scale of the mouth of the Synchro casing, and Fig. 3 is a view of the mounting jig for the unit.

Referring now to the drawings, the Synchro unit comprises a cup-shaped casing 11 which has an axial bore 12 through its end wall 13. The end wall also has two annular mounting shoulders 14 and 15 concentric with bore 12 and an annular groove 16 is provided in the periphery of the casing 11 adjacent said end wall 13.

The inner surface of wall 13 has an inwardly extending flange 17 concentric with bore 12 on which is seated the outer periphery of a dust cover 18 in the form of a washer. Positioned in bore 12, is a bearing 19, the outer race 21 of which rests against the periphery of washer 18. To retain the bearing 19 in the bore 12, the diameter of said bore 12 is increased at its outer end as at 24 and provided with an internal annular groove 25. A second dust cover 26, also a washer, has the portion thereof adjacent its inner periphery resting against the outer race 21 of the bearing 19 and spaced from the inner race 27. The outer periphery of the washer 26 is substantially L-shaped defining an annular lip 28 against which a snap ring 29 reacts, the latter being positioned in the annular groove 25 and extending laterally outward therefrom over said lip 28.

With the above construction, the bearing 19 will be securely yet releasably retained in the bore 12 and by reason of the dust cover washers 18 and 26, no foreign matter will enter the bearing 19 or the casing bore 31.

Positioned in the casing 11 and preferably cemented therein is a stator member 33 formed in conventional manner from a stack of laminations having an axial bore 34 therethrough of diameter originally slightly less than ultimately desired and which is ground to the desired diameter in the manner hereinafter described. Means are provided to insure that there will be no longitudinal movement of the stator 33 in the casing bore 31. To this end, the casing is provided with an internal annular shoulder or stop 35 adjacent end wall 13 against which rests the periphery 36 of the stator 33. To retain the stator 33 against shoulder 35, an annular member 38, desirably a ring of relatively hard yet slightly compressible rubber-like material, such as "neoprene," is positioned in the casing adjacent the end 39 of the stator. The diameter of the annular member 38 is such that it may readily be inserted into the mouth 41 of the casing 11 yet will fit snugly therein.

To urge the member 38 into the casing 11 so that it will press against the end 39 of the stator to retain the periphery 36 thereof against shoulder 35, a retaining member 44 is provided. The retaining member 44 is substantially cup-shaped, having a side wall 45 of outer diameter just slightly less than the inner diameter of the casing so that it may readily be inserted therein with substantially no lateral play. The outer periphery of the retaining member adjacent its end wall 46 has an annular notch 47 therein defining a shoulder 48 (Fig. 2) on which a snap ring 49 may be seated. The snap ring is positioned in an internal annular groove 50 in the wall of the casing 11 and extends laterally outward therefrom over shoulder 48.

Thus, when the retaining member 44 is moved inwardly into the casing 11, the end 51 of wall 45 will abut against the annular member 38 slightly compressing the latter to retain the periphery 36 of the stator 33 against annular shoulder 35 and by reason of the resilience of the compressed member 38, the shoulder 48 of the retaining member 44 will be securely held against snap ring 49 so that there will be no longitudinal displacement of the stator 33.

Extending transversely across the mouth 41 of the casing 11 is a bearing mounting member 53, illustratively a circular plate having an outer diameter substantially equal to that of the casing 11. The plate 53 has a peripheral annular notch 54 (Fig. 2) defining a shoulder 55 which may seat against the mouth 41 of the casing 11. The surface of the plate 53 adjacent the notch 54 is desirably beveled as at 56 and the junction between the beveled portion 56 and the wall 57 of the notch defines a relatively sharp annular edge 58. As shown in Fig. 2, the portion of the casing 11 adjacent its mouth 41 is slightly beveled as at 59 and the angle of the beveled portion 56 is greater than that of the beveled portion 59 so that said edge 58 will abut against beveled portion 59.

The bearing mounting member 53 is securely retained in the mouth 41 of the casing by means of a retaining ring 61 of outer diameter substantially equal to that of the casing 11. The retaining ring has a plurality of bosses 62 on its inner surface which fit into corresponding bores 63 in the member 53. The ring 61 has a plurality of bores 64 which extend through the bosses 62 and are aligned with complementary bores 65 in the retaining member 44, said bores 65 being internally threaded to receive the end of a hollow internally threaded screw 66. The screws 66 are headed as at 67 so that when tightened the heads of the screws will force the retaining ring 61 against the bearing mounting member 53 to retain the latter in fixed position, without play, in the mouth 41 of the casing.

To completely seal the unit, a cover plate 68 is provided which fits against the ring 61 and has openings 69 therethrough aligned with the bore 71 of the hollow screws 66. Thus, when headed screws 72 are inserted into the screws 66 and tightened, the plate 68 will be securely retained against the ring 61.

The plate 53 has an annular boss 75 on its inner surface which extends through an axial bore 76 in retaining member 44. The boss 75 has an axial bore 77 therethrough with an inwardly extending flange 78 concentric therewith and a bearing 81 is positioned in bore 77 being retained therein by elements identical to those associated with bearing 19 and having the same reference numerals.

Positioned in the bore 34 of the stator 33 is a rotor member 82 which has a shaft 83 that extends through bearings 19 and 81. The end 84 of shaft 83 associated with the bearing 19 extends beyond the end wall 13 and the end 85 of the shaft 83 associated with the bearing 81 extends into the cavity 86 defined by cover plate 68.

The shaft 83 has conventional slip rings 87 thereon electrically connected to the windings of the rotor 82 and these slip rings are engaged by brushes (not shown) connected to leads or external terminals (not shown) of the Synchro unit. Also connected to such external terminals by means of suitable leads 91 are the windings of the stator 33, said leads 91 extending through suitable openings 92 in retaining member 44 and may also extend through the cover plate 68 or be connected to suitable terminals.

The construction above described lends itself to a method of manufacture which insures highly precise alignment of the elements of the Synchro.

According to such method, the casing 11 is mounted on a suitable jig and the bore 12 and annular shoulders 14 and 15 are turned simultaneously with a conventional multiple tool so that they will be concentric and cylindrical.

The stator 33 is inserted into the casing with its periphery 36 against shoulder 35 and cemented in position. The ring 38 is then placed into the casing against the end 39 of the stator and thereupon the retaining member 44 is positioned against the ring 38 and retained in position by the snap ring 49.

The casing 11 is then mounted on a jig (Fig. 3) which has a plug 94 that is precision ground so that it will fit accurately into the bore 12 of the casing 11 without lateral play. The casing is secured to the jig 93 by means of suitable clamp arms 95 which coact with the annular groove 16 of the casing.

The jig 93 which is rotatably mounted, is associated with a grinding tool 96 mounted on an axis 97 parallel to the axis of the plug 94. The jig 93 and the grinding tool 96 are then rotated and the tool is adjusted in conventional manner until the bore 34 of the stator 33 is of the desired diameter to receive the rotor 82, and give desired electrical performance which depends upon the air gap between the rotor and stator bore. As the axis of the grinding tool is parallel to that of the plug 94 and as the axis of the latter is the same as that of the bore 12, it is apparent that the bores 12 and 34 will be concentric and the bore 34 will also be cylindrical.

After the bore 34 is finished, as above described, with the casing 11 still mounted on the jig 93, the inner diameter of the mouth 41 of the casing is turned by means of a tool 98 to form the slight bevel 59. As the casing is still mounted on the jig 93, it is apparent that the inner circumference of the mouth 41 will be concentric with the bores 12 and 34 and such mouth will be cylindrical.

The bearing mounting member 53 is accurately machined so that its annular edge 58 is concentric with the bore 77 thereof and both the annular edge 58 and bore 77 are circular. This is accomplished by turning said edge 58 and bore 77 at the same time with a multiple tool. Thus, when the edge 58 rests against beveled surface 59 and the screws 66 are tightened until shoulder 55 abuts against end 41 of the housing, the bore 77 will be axially aligned with the bore 12.

The method above described insures that the axis about which the rotor turns in the bore of the stator will be aligned with the axis of said bore and that the stator bore will be truly cylindrical, thereby providing the desired electrical characteristics and accuracy.

In addition to the foregoing, with the method above described the diameter of the stator bore 34 is independent of the diameter of the bores 12 and 77 in which the bearings 19 and 81 are mounted. Hence the diameter of the rotor 82 and the stator bore 34 may be selected for optimum electrical characteristics, without need for any comprise due to the fact that standard bearings are in given ranges of diameters, none of which may match the desired rotor diameter.

As the lamination material from which the stator is formed differs from that of the casing, and as the tool for grinding the stator bore 34 is only used for this purpose, it may be selected for optimum grinding action through such material resulting in enhanced speed of production without excessive work hardening of the stator laminations which might permanently affect the magnetic characteristics of such stator material.

In addition, as the mounting shoulders 14 and 15 are concentric with bore 12, when such shoulders are positioned in a preformed opening in a chassis, for example, which opening is substantially the same diameter as the shoulders 14 or 15, as the case may be, the unit driven by shaft 83 may be permanently mounted in place with assurance that the shaft 83 will be accurately aligned with the shaft of the driven unit, and such alignment will remain without need for adjustment even if a replacement Synchro is installed.

As many changes could be made in the above construction and method, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A motor of the character described comprising a substantially cup-shaped casing having an end wall with an axial bore therethrough, a stator member in said casing having a bore axially aligned with the bore in said end wall, said casing having an internal stop conformation adjacent said end wall, a ring member of resilient material in said casing of diameter substantially equal to the inner diameter of said casing, said ring member being positioned between the mouth of the casing and the adjacent end of the stator, an annular retaining member in said casing reacting against said resilient ring to urge said stator against said stop, means to prevent displacement of said retaining member from the mouth of the casing, a bearing plate, means mounting said plate to said retaining member, said bearing plate having an axial bore aligned with the bore in said end wall, a pair of bearings mounted respectively in the bores in said end wall and said bearing plate, and a rotor in the bore of said stator, said rotor having a shaft mounted in said bearings.

2. The combination set forth in claim 1 in which the bores in said end wall and said bearing plate each has a stop conformation at its inner end to restrain inward movement of the associated bearing, the outer ends of said bores being of enlarged diameter and having an annular groove, a washer encompassing each end of the rotor shaft extending through the bearings, the outer periphery of each of said washers extending laterally beyond the outer race of the associated bearing, and a snap ring in each of said annular grooves coacting with the laterally extending periphery of the associated washer to retain the bearings in their associated bores.

3. The combination set forth in claim 1 in which the means mounting said bearing plate to said retaining member comprises a retaining ring having a plurality of bores therethrough aligned with corresponding bores in said bearing plate and with corresponding threaded bores in said retaining member and screws extending through the bores in said retaining ring and said bearing plate and coacting with the threaded bores in said bearing plate.

4. The combination set forth in claim 1 in which the mouth of said casing is beveled and the periphery of said bearing plate is conformed as a sharp annular edge of diameter that is between the minimum and maximum diameter of the beveled portion of the mouth of the casing, and the means mounting said bearing plate to said retaining member comprises a plurality of screws passing through bores in said bearing plate into threaded bores in said retaining member whereby when said screws are tightened, the bearing plate will be moved toward said retaining member and the annular edge of said bearing plate will engage the beveled portion of the casing mouth.

5. The combination set forth in claim 1 in which the mouth of said casing is beveled and the periphery of said bearing plate is conformed as a sharp annular edge of diameter that is between the minimum and maximum diameter of the beveled portion of the mouth of the casing, the means mounting said bearing plate to said retaining member comprises a retaining ring having a plurality of bores therethrough aligned with corresponding bores in said bearing plate and with corresponding threaded bores in said retaining member and screws extending through the bores in said retaining ring and said bearing plate and coacting with the threaded bores in said bearing plate whereby when said screws are tightened the bearing plate will be moved toward said retaining member and the annular edge of said bearing plate will engage the beveled portion of the casing mouth.

References Cited in the file of this patent

UNITED STATES PATENTS

| | | |
|---|---|---|
| 1,902,629 | Evans | Mar. 21, 1933 |
| 1,947,234 | Sundstrand | Feb. 13, 1934 |
| 2,277,084 | Drissner | Mar. 24, 1942 |
| 2,329,151 | Brady | Sept. 7, 1943 |
| 2,412,254 | Edelman | Dec. 10, 1946 |
| 2,650,992 | Forss et al. | Sept. 1, 1953 |
| 2,668,925 | Blosser | Feb. 9, 1954 |

FOREIGN PATENTS

| | | |
|---|---|---|
| 677,806 | Great Britain | Aug. 20, 1952 |
| 872,090 | Germany | Mar. 30, 1953 |